United States Patent [19]

Kim et al.

[11] Patent Number: 6,107,402
[45] Date of Patent: Aug. 22, 2000

[54] OPTICAL POLYMER COMPOSITION

[75] Inventors: Eun-Ji Kim; Kwan-Soo Han, both of Seoul; Woo-Hyuk Jang, Yongin-shi; Tae-Hyung Rhee, Sungnam, all of Rep. of Korea

[73] Assignee: SamSung Electronics Co., Ltd., Kyungki-do, Rep. of Korea

[21] Appl. No.: 09/193,135

[22] Filed: Nov. 17, 1998

[30] Foreign Application Priority Data

Nov. 17, 1997 [KR] Rep. of Korea ................ 97/60591

[51] Int. Cl.⁷ .................................................. C08L 51/04
[52] U.S. Cl. ............................................. 525/71; 525/89
[58] Field of Search ........................................ 525/89, 71

[56] References Cited

U.S. PATENT DOCUMENTS

| | | | |
|---|---|---|---|
| 3,882,193 | 5/1975 | Rice | 528/392 |
| 4,652,592 | 3/1987 | Kawashima | 525/281 |
| 4,666,991 | 5/1987 | Matsui | 525/536 |
| 4,782,115 | 11/1988 | Paul | 525/89 |
| 5,021,504 | 6/1991 | Fujita | 525/89 |
| 5,049,622 | 9/1991 | Abe | 525/273 |
| 5,053,276 | 10/1991 | Siol et al. . | |
| 5,115,056 | 5/1992 | Mueller | 526/245 |
| 5,162,444 | 11/1992 | Himori | 525/276 |
| 5,170,461 | 12/1992 | Yoon et al. . | |
| 5,189,114 | 2/1993 | Brown | 525/89 |
| 5,282,854 | 2/1994 | Yagi | 523/105 |
| 5,322,900 | 6/1994 | Siol et al. . | |
| 5,370,813 | 12/1994 | DeNicola | 525/89 |
| 5,378,760 | 1/1995 | Modic | 525/89 |
| 5,824,400 | 10/1998 | Petrakis | 525/89 |
| 5,914,386 | 6/1999 | Berendse | 525/89 |

FOREIGN PATENT DOCUMENTS

| | | |
|---|---|---|
| 0 355 642 | 2/1990 | Germany . |
| 1-189602 | 7/1989 | Japan . |
| 1-200305 | 8/1989 | Japan . |
| 2-16505 | 1/1990 | Japan . |
| 2-176604 | 7/1990 | Japan . |
| 2-244007 | 9/1990 | Japan . |
| 3-143945 | 6/1991 | Japan . |
| 4-189862 | 7/1992 | Japan . |
| 5-287032 | 11/1993 | Japan . |
| 8-304635 | 11/1996 | Japan . |
| 8-334601 | 12/1996 | Japan . |
| 9-258042 | 10/1997 | Japan . |

*Primary Examiner*—Edward J. Cain
*Attorney, Agent, or Firm*—Robert E. Bushnell, Esq.

[57] ABSTRACT

An optical polymer composition in which polymers having the same repeating units with different polymerization ratios are mixed in an arbitrary ratio. An optical material having a desired refractive index can be attained by appropriately adjusting the mixing ratio based on weight. With such a composition, it is easy to finely adjust the difference in refractive indices between a core and a cladding forming an optical waveguide, thus an optical waveguide device can be easily fabricated.

10 Claims, No Drawings

OPTICAL POLYMER COMPOSITION

CLAIM OF PRIORITY

This application makes reference to, incorporates the same herein, and claims all benefits accruing under 35 U.S.C. §119 from an application for OPTICAL POLYMER COMPOSITION earlier filed in the Korean Industrial Property Office on Nov. 17$^{th}$, 1997 and there duly assigned Serial No. 60591/1997.

BACKGROUND OF THE INVENTION

1. Field of the Invention

The present invention relates to an optical polymer composition, and more particularly, to an optical polymer composition for use in an optical waveguide.

2. Description of the Related Art

Some polymers have been used for an optical substrate and an optical lens or a compact disk. Recently, research has been conducted on polymers to be used as a material for an optical waveguide for light of near infrared wavelength.

The polymers which have been applied to this field, however, absorb the light of 1,000~1,700 nm which is in the near infrared. Such absorption of near infrared rays by the polymer is caused by overtone of harmonics of stretching and deformation vibrations of chemical bonds between carbon and hydrogen (C—H bond) in alkyl, phenyl or other similar functional groups. Thus, using a polymer having these groups as a material for an optical waveguide utilizing light in the near infrared wavelength range results in a large optical loss. In order to reduce this optical loss, the light absorption wavelength of the polymer should be shifted to the wavelength region which is longer or shorter than the wavelength of the near infrared rays. To this end, the substitution of fluoride (F) or heavy hydrogen (deuterium, D) for the hydrogen (H) of the C—H bond has been suggested.

In case of substituting deuterium for the hydrogen, carbon-deuterium (C—D) bond absorbs a large amount of light of 1,500 nm, so that this method is not suitable to form a material to be used in an optical communications device utilizing light of 1500 nm wavelength. It is known, though, that the method for substituting F for H minimizes the optical absorption loss in the wavelength range of 1,000~1,700 nm.

When fabricating an optical waveguide device, a core is required to be surrounded by a cladding, such that an optical signal is guided through the core. Here, the cladding should have a refractive index lower than that of the core within the wavelength region for optical communications. This difference in refractive indices between the core and the cladding determines the size of an optical waveguide and affects the design of an optical waveguide device.

The refractive index of a polymer is in general determined by its molecular structure. In a conventional method for preparing materials for a core and a cladding each having a different refractive index, a first polymer having a predetermined refractive index is obtained, and the first polymer is then partially modified to attain a second polymer whose refractive index is slightly different from that of the first polymer. Such prepared first and second polymers are used as materials for the core and the cladding, respectively.

The material for an optical waveguide device must satisfy the following conditions. First, considering the optical characteristic aspect, optical absorption by the material itself must be low in order to reduce the optical loss. Considering the process characteristic aspect, film forming properties should be suitable to fabricate an optical waveguide. Also, the material must have thermal and polarizing characteristics so as to resist damages caused by external factors during the manufacturing process.

Separately synthesizing a polymer having a predetermined refractive index as well as satisfying the above requirements, however, requires much labor and time, and to achieve such synthesis is very difficult in practice. The refractive index of the core should be greater than that of the cladding as described above. Thus, when a polymer for the cladding is prepared to have a similar structure to that of a polymer for the core, with different amounts of fluorine substitution, the amount of F contained in the polymer for the core should be reduced compared to the polymer for the cladding. Such a reduction in the amount of F in the polymer, however, requires the presence of C—H bonds, and causes optical loss by the light absorption of the polymer.

One suggested method to attain materials for the core and cladding which satisfy a desired difference in the refractive index, is a method for mixing two compounds having different refractive indices in a predetermined mixing ratio. However, this method causes phase separation.

Based on our observation of the art, we have found that what is needed is an optical polymer composition suitable for use in a near infrared optical waveguide. The polymer must have low optical loss, allow for adjustment of refractive index, and not lead to phase separation of mixed polymers.

SUMMARY OF THE INVENTION

Therefore it is an object of the present invention to provide an improved optical polymer composition.

It is a further object of the present invention to provide an improved optical polymer composition for use with near infrared light.

It is a still further object to provide an optical polymer composition with low light loss at near infrared wavelengths.

It is a yet further object to provide an optical polymer composition with suitable film forming properties for fabrication.

It is a still yet further object to provide a polymer composition with suitable thermal characteristics to resist damage during manufacture.

It is another object to provide a polymer composition with suitable polarizing characteristics to resist damage during manufacture.

It is still another object to provide a polymer composition allowing manufacture of a core and cladding of different refractive indices without introduction of C—H bonds.

It is yet still another object to provide a polymer composition allowing manufacture of a core and cladding of different refractive indices without phase separation which can occur when two different polymers are mixed.

To achieve the above objects, the present invention provides an optical polymer composition having a refractive index suitable for a material for an optical waveguide, as well as solving the problem of phase separation. Specifically, there is provided an optical polymer composition in which a copolymer expressed by the general formula $A_uB_v$ and a copolymer expressed by the general formula $A_xB_y$ are mixed in an arbitrary ratio. Here A and B are different repeating units selected from the group consisting of the repeating units of polyarylenesulfide, polyhaloarylenesulfide, polysulfone, modified polysulfones, polyhalosulfone, modified polyhalosulfones, polysulfonate, modified polysulfonates, polyhalosulfonate, modified polyhalosulfonates, polycarbonate, polyhalocarbonate, polyacrylate, polyhaloacrylate, polyarylene ether, polyhaloarylene ether, polyester, polyhaloester, polyolefines, polyhaloolefin, polyvinylhalide, polyoxole, polyhalooxole, polydioxole, polyhalodioxole, polythiol, polyhalothiol, polydithiol, polyhalodithiol, polyoxolane, polyhalooxolane, polydioxolane, polyhalodioxolane, polythiolane, polyhalothiolane, polydithiolane, polyhalodithiolane, polyimide, modified polyimides, polyhaloimide, modified polyhaloimide, polyamide, polyhaloamide, modified polyamides, modified haloamides, polystyrene, polyhalostyrene, polysiloxane, polyhalosiloxane, polysilane, polyhalosilane, polymaleimide, polybismaleimide, polyhalomaleimide, polyphosphazene, polyhalophosphazene, polyphosphonate and polyhalophosphonate. Moreover, hydrogens (Hs) of C—H, O—H, S—H or N—H bond in the halogenated compounds are partially or entirely substituted by at least one selected from the group consisting of fluoride (F) and chlorine (Cl); and 0<u<1, 0<v<1, 0<x<1 and 0<y<1, wherein subscripts u, v, x and y represent mole fraction and satisfy the conditions of u+v=1 and x+y=1.

Preferably, the modified polysulfone is polyethersulfone or polysulfidesulfone, and the modified polysulfonate is polyethersulfonate or polysulfidesulfonate. Also, preferably, the modified polyolefin is polyethylene, polypropylene or polybutylene, and the modified polyimide is polyesterimide, polyetherimide or polysulfideimide, and the modified polyamides is polyesteramide, polyetheramide or polysulfideamide.

DESCRIPTION OF THE PREFERRED EMBODIMENTS

In an optical polymer composition according to the present invention, polymers having different copolymerization ratios, that is, copolymers expressed by the general formulae $A_uB_v$ and $A_xB_y$, are mixed in an appropriate ratio, such that the difference in refractive indices between a core and a cladding constituting an optical waveguide can be finely adjusted. Here, the copolymers represented by the general formulae $A_uB_v$ and $A_xB_y$ may be mixed in any ratio without limitation. Also, phase separation between the copolymers represented by the general formulae $A_uB_v$ and $A_xB_y$ hardly occurs, thereby minimizing optical scattering loss caused by such phase separation.

In the above formulae $A_uB_v$ and $A_xB_y$, A and B are different repeating units selected from the group consisting of the repeating units of polyarylenesulfide, polyhaloarylenesulfide, polysulfone, modified polysulfones such as polyethersulfone and polysulfidesulfone, polyhalosulfone, modified polyhalosulfones, polysulfonate, modified polysulfonates such as polyathersulfonate and polysulfidesulfonate, polyhalosulfonate, modified polyhalosulfonate, polycarbonate, polyhalocarbonate, polyacrylate, polyhaloacrylate, polyarylene ether, polyhaloarylene ether, polyester, polyhaloester, polyolefines such as polyethylene, polypropylene and polybutylene, polyhaloolefin, polyvinylhalide, polyoxole, polyhalooxole, polydioxole, polyhalodioxole, polythiol, polyhalothiol, polydithiol, polyhalodithiol, polyoxolane, polyhalooxolane, polydioxolane, polyhalodioxolane, polythiolane, polyhalothiolane, polydithiolane, polyhalodithiolane, polyimide, modified polyimides such as polyesterimide, polyetherimide and polysulfideimide, polyhaloimide, modified polyhaloimide, polyamide, polyhaloamide, modified polyamide such as polyesterimide, polyetheramide and polysulfideimide, modified haloamides, polystyrene, polyhalostyrene, polysiloxane, polyhalosiloxane, polysilane, polyhalosilane, polymaleimide, polybismaleimide, polyhalomaleimide, polyphosphazene, polyhalophosphazene, polyphosphonate and polyhalophosphonate. Moreover, hydrogens (Hs) of C—H, O—H, S—H or N—H bonds in the halogenated compounds are partially or entirely substituted by at least one selected from the group consisting of fluoride (F) and chlorine (Cl); and 0<u<1, 0<v<1, 0<x<1 and 0<y<1, wherein u, v, x and y represent mole fraction and satisfy the conditions of u+v=1 and x+y=1.

Hereinafter, an optical polymer composition according to a preferred embodiment of the present invention will be described. The two copolymers of this embodiment are represented by the general formulae $A_uB_v$ and $A_xB_y$, where A is the a first repeating unit, perfluoro-2,2-dimethyl-1,3-dioxole (equation 1), and B is a second repeating unit, tetrafluoroethylene (equation 2). Again u,v,x and y are mole fractions and u+v=1, and x+y=1, and 0<u<1, 0<v<1, 0<x<1 and 0<y<1.

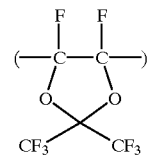

(1)

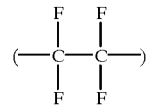

(2)

The two copolymers of this embodiment, which have different refractive indices according to the respective copolymerization ratios of the first and second repeating units, are mixed in a predetermined ratio, to prepare an optical polymer composition. Here, a refractive index of the obtained composition is determined by a mixing ratio based on weight of the copolymers.

The optical polymer composition of the present invention does not undergo phase separation which causes the problem of light scattering. Also, a fine adjustment in the difference in refractive indices between a core and a cladding constituting of an optical waveguide device can be easily achieved using the polymer composition of the present invention. Thus the polymer composition can be used as a material for the core and the cladding of a waveguide.

As described above, in the optical polymer composition according to the present invention, an optical material having a desired refractive index can be obtained by mixing, in a predetermined ratio based on weight, the two polymers represented by the general formulae $A_uB_v$ and $A_xB_y$ in which repeating units A and B are the same, but which have different copolymerization ratios. It is easy to finely adjust the difference in refractive indices between the core and the cladding forming the optical waveguide, using the optical composition according to the present invention. This yields a greatly simplified fabrication of an optical waveguide compared to the conventional method.

The optical polymer composition according to the present invention can be useful as an essential optical material for an optical communications device such as an opto-electronic integrated circuit (OEIC), an opto-electrical mixed wiring board (OEMWB), hybrid integration device, a plastic optical fiber and a multi-chip module (MCM).

What is claimed is:

1. An optical polymer composition, consisting essentially of:
   a first copolymer consisting essentially of repeating units A and B, of general composition $A_uB_v$, where u and v are mole fractions;
   and a second copolymer consisting essentially of repeating units A and B, of general composition $A_xB_y$, where x and y are mole fractions and the value of u is different from x and the value of v is different from y;
   A and B being different repeating units each selected from the group consisting of the repeating units of polyarylenesulfide, polyhaloarylenesulfide, polysulfone, modified polysulfones, polyhalosulfone, modified polyhalosulfones, polysulfonate, modified polysulfonates, polyhalosulfonate, modified polyhalosulfonates, polycarbonate, polyhalocarbonate, polyhaloacrylate, polyarylene ether, polyhaloarylene ether, polyester, polyhaloester, polyethylene, polypropylene, polybutylene, polyhaloolefin, polyvinylhalide, polyoxole, polyhalooxole, polydioxole, polyhalodioxole, polythiol, polyhalothiol, polydithiol, polyhalodithiol, polyoxolane, polyhalooxolane, polydioxolane, polyhalodioxolane, polythiolane, polyhalothiolane, polydithiolane, polyhalodithiolane, polyimide, modified polyimides, polyhaloimide, modified polyhaloimide, polyamide, polyhaloamide, modified polyamides, modified haloamides, polystyrene, polyhalostyrene, polysiloxane, polyhalosiloxane, polysilane, polyhalosilane, polymaleimide, polybismaleimide, polyhalomaleimide, polyphosphazene, polyhalophosphazene, polyphosphonate and polyhalophosphonate; and
   the halogenated repeating units having the hydrogens of the C—H, O—H, S—H or N—H bonds partially or fully substituted by fluoride (F) or chloride (Cl).

2. The optical polymer composition of claim 1, where A represents the repeating unit,

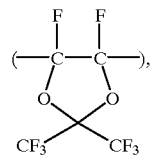

that is, perfluoro-2,2-dimethyl-1,3-dioxole;
and B represents the repeating unit,

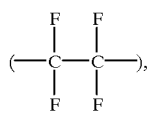

that is, tetrafluoroethylene.

3. The optical polymer composition of claim 1, wherein said repeating unit of modified polysulfone is polyethersulfone or polysulfidesulfone.

4. The optical polymer composition of claim 1, wherein said repeating unit of modified polysulfonate is polyethersulfonate or polysulfidesulfonate.

5. The optical polymer composition of claim 1, wherein said repeating unit of modified polyimide is polyesterimide, polyetherimide or polysulfideimide.

6. The optical polymer composition of claim 1, wherein the said repeating unit of modified polyamide is polyesteramide, polyetheramide or polysulfideamide.

7. An optical polymer composition, comprising:
   a first copolymer consisting essentially of repeating units A and B, of general composition $A_uB_v$, where u and v are mole fractions;
   and a second copolymer consisting essentially of repeating units A and B, of general composition $A_xB_y$ where x and y are mole fractions and the value of u is different from x and the value of v is different from y; and
   where A represents the repeating unit, perfluoro-2,2-dimethyl-1,3-dioxole, and B represents the repeating unit, tetrafluoroethylene.

8. A method of making an optical polymer composition, comprising the steps of:
   making a first copolymer consisting essentially of repeating units of perfluoro-2,2-dimethyl-1,3-dioxole and tetrafluoroethylene with a first ratio of perfluoro-2,2-dimethyl-1,3-dioxole to tetrafluoroethylene;
   making a second copolymer consisting essentially of perfluoro-2,2-dimethyl-1,3-dioxole and tetrafluoroethylene with a ratio of perfluoro-2,2-dimethyl-1,3-dioxole to tetrafluoroethylene different from said first ratio; and
   mixing said first copolymer and said second copolymer in a mixing ratio to give a composition with a desired value of refractive index.

9. A method of making an optical polymer composition, comprising the steps of:
   making a first copolymer consisting essentially of repeating units A and B with a first ratio of A to B;
   making a second copolymer consisting essentially of repeating units A and B with a ratio different from said first ratio;
   wherein A and B are different and selected from the group consisting of the repeating units of polyarylenesulfide, polyhaloarylenesulfide, polysulfone, modified polysulfones, polyhalosulfone, modified polyhalosulfones, polysulfonate, modified polysulfonates, polyhalosulfonate, modified polyhalosulfonates, polycarbonate, polyhalocarbonate, polyacrylate, polyhaloacrylate, polyarylene ether, polyhaloarylene ether, polyester, polyhaloester, polyolefin, polyhaloolefin, polyvinylhalide, polyoxole, polyhalooxole, polydioxole, polyhalodioxole, polythiol, polyhalothiol, polydithiol, polyhalodithiol, polyoxolane, polyhalooxolane, polydioxolane, polyhalodioxolane, polythiolane, polyhalothiolane, polydithiolane, polyhalodithiolane, polyimide, modified polyimides, polyhaloinide, modified polyhaloimide, polyamide, polyhaloamnide, modified polyamides, modified haloamides, polystyrene, polyhalostyrene, polysiloxane, polyhalosiloxane, polysilane, polyhalosilane, polymaleimide, polybismaleinide, polyhalomaleimide, polyphosphazene, polyhalophosphazene, polyphosphonate and polyhalophosphonate; and
   where when repeating unit A or B is a halogenated compound, at least one hydrogen of a C—H, O—H or S—H bond in the subunit is substituted by a fluorine or chlorine; and mixing said first copolymer and said second copolymer in a mixing ratio to give a composition with a desired value of refractive index.

10. The optical polymer composition of claim 1, said repeating units A and B each being selected from the group consisting of the repeating units of polyhaloarylenesulfide, polyhalosulfone, modified polyhalosulfones, polyhalosulfonate, modified polyhalosulfonates, polyhalocarbonate, polyhaloacrylate, polyhaloarylene ether, polyhaloester, polyhaloolefin, polyvinylhalide, polyhalooxole, polyhalodioxole, polyhalothiol, polyhalodithiol, polyhalooxolane, polyhalodioxolane, polyhalothiolane, polyhalodithiolane, polyhaloimide, modified polyhaloimide, polyhaloamide, modified haloamides, polyhalostyrene, polyhalosiloxane, polyhalosilane, polyhalomaleimide, polyhalophosphazene and polyhalophosphonate.

* * * * *